United States Patent

[11] 3,596,869

[72] Inventor David H. Humphrey
G.P.O. Box 2226, San Juan, P.R. 00903
[21] Appl. No. 805,474
[22] Filed Mar. 10, 1969
[45] Patented Aug. 3, 1971

[54] MOLD FORMING DEVICE
15 Claims, 12 Drawing Figs.
[52] U.S. Cl. .................................................. 249/155,
18/5 P
[51] Int. Cl. .................................................. B29c 1/00,
B29c 1/16
[50] Field of Search .......................................... 18/5 M, 19
F, 32, 34 M, 42 M, 43, 34 R; 164/172, 173;
249/155; 269/287

[56] References Cited
UNITED STATES PATENTS
881,912 3/1908 Emrick .......................... 249/155 X
3,041,669 7/1962 Marshall ........................ 18/19
3,319,295 5/1967 Jones-Hinton ................. 18/19

Primary Examiner—J. Spencer Overholser
Assistant Examiner—Norman E. Lehrer
Attorney—Allegretti, Newitt & Witcoff ABSTRACT: A mold forming device comprising a housing having open ends, a plurality of rods loosely filling the housing and individually adjustable longitudinally therein and means to constrict the inner dimension of the housing to lock the rods against longitudinal adjustment. The rods can be adjusted manually to create a molding surface of desired contour, or may be permitted to slide longitudinally and engage a physical surface, the shape of which is to be duplicated either positively or negatively whereupon the rods are locked so that the housing and the adjusted rods may be used as a forming mold. By laminating the housing, alternate laminations thereof may be relatively offset to effect constriction of the inner dimension of the housing in relation to the rods for locking them against longitudinal adjustment.

To effect smoothing the molding surface presented by the ends of the rods, they may be covered by a flexible diaphragm. By having diaphragms at both ends of the housing and providing sealing means for the inner wall of the housing, the space among the rods may be evacuated for pulling the diaphragms at the ends of the rods into contact therewith.

The housing and rods may be associated with vacuum-forming or pressure-forming chambers to hot-form sheets of plastic to the mold faces.

By providing rods of equal length, whenever they are adjusted to form one molding surface, either male or female, the other ends of the rods form a complementary female or male molding surface respectively.

Patented Aug. 3, 1971

Inventor:
David H. Humphrey
By Bair, Freeman & Molinare
Attys.

Patented Aug. 3, 1971
3,596,869
3 Sheets-Sheet 2
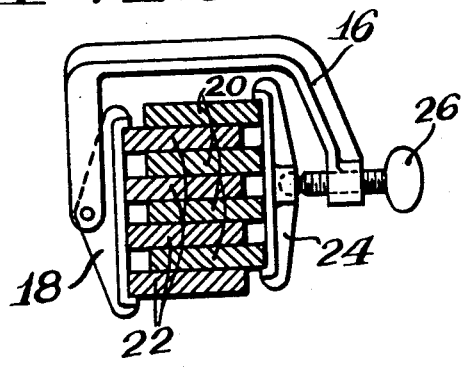
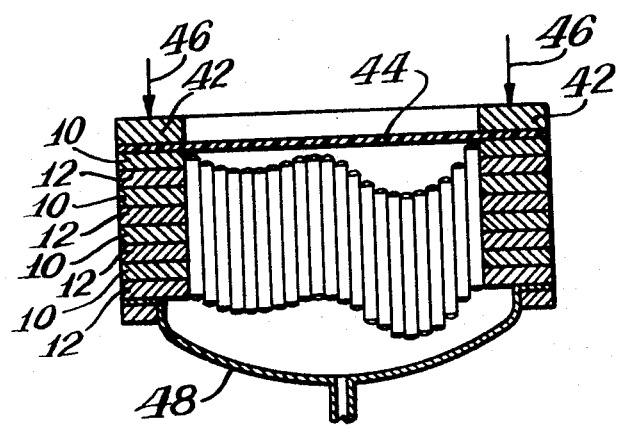
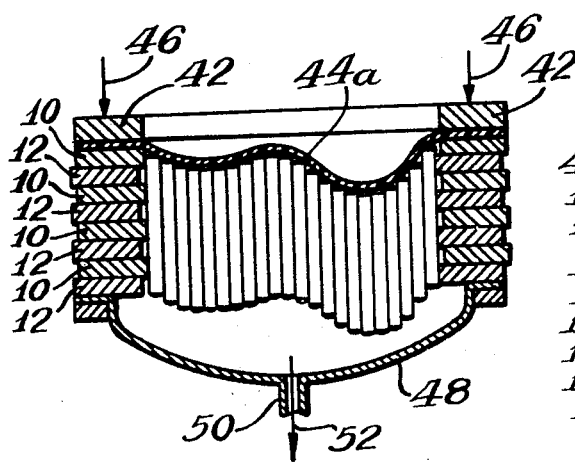
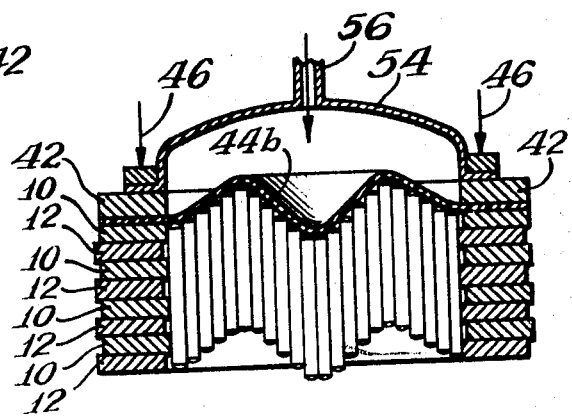
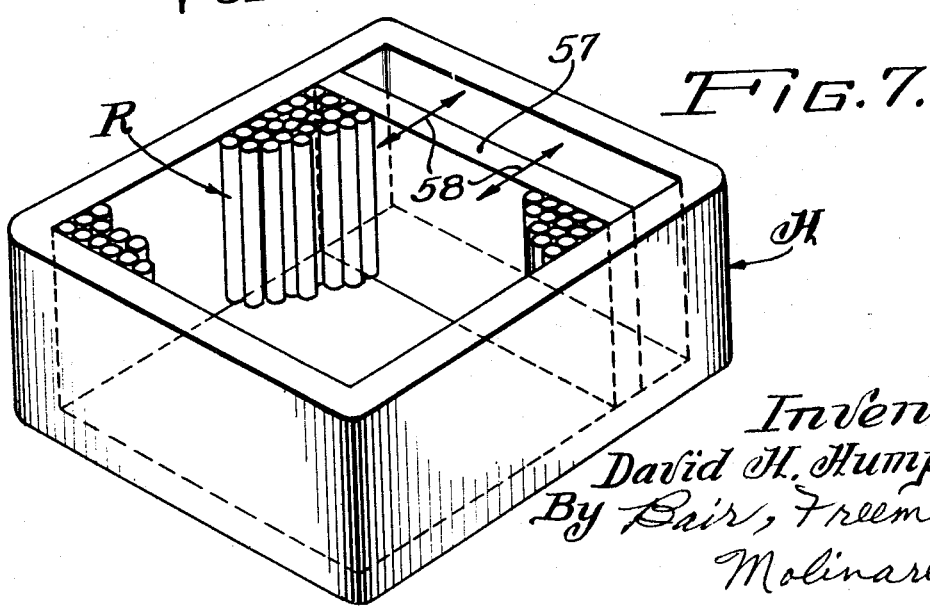
Inventor:
David H. Humphrey
By Bair, Freeman &
Molinare Attys.

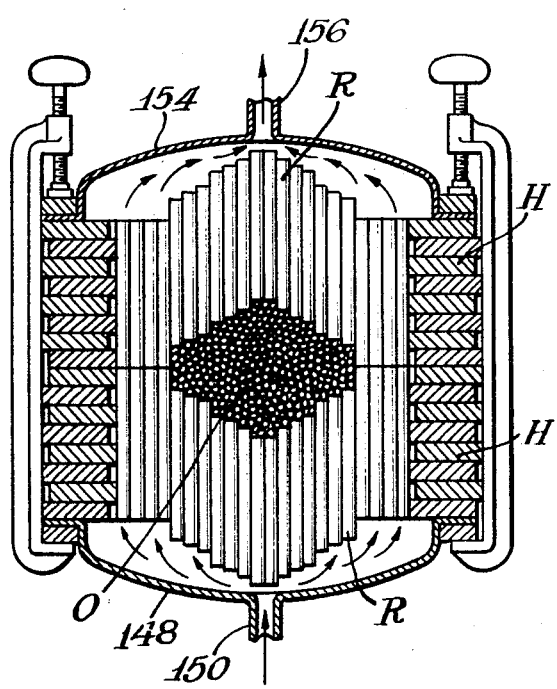
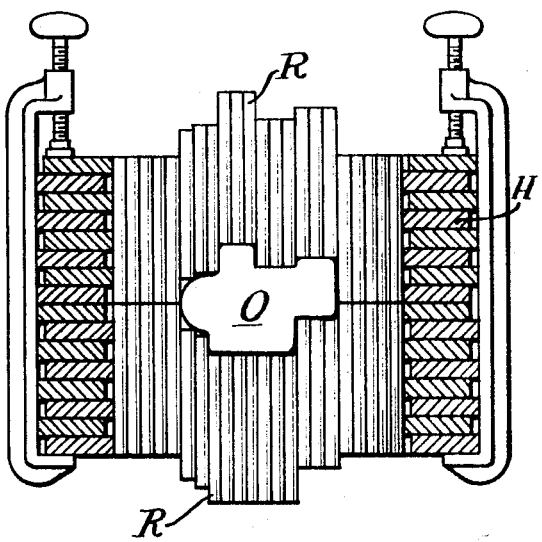
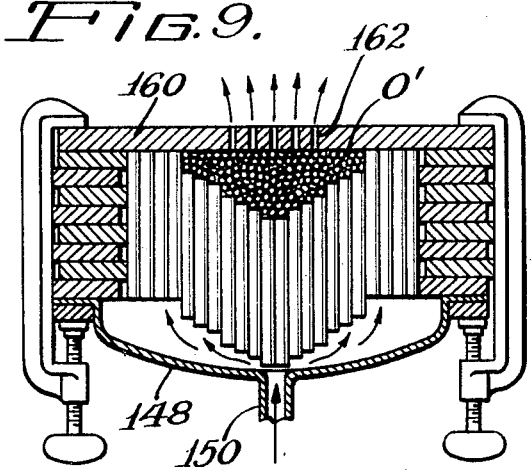
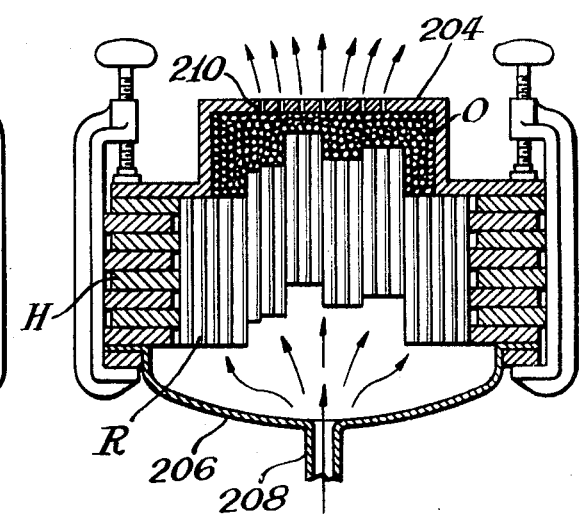
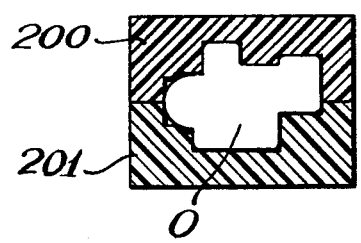

MOLD FORMING DEVICE

BACKGROUND OF THE INVENTION

Present day methods for mold forming are to first make an exact pattern in wood, plaster, clay or the like which is usually a process of cutting material (such as carving a block of wood), or building up material (such as using modeling clay). In either case there is a lot of work to be done before the shape emerges in its final form or even in an unrefined final form. Any changes in the shape desired are time consuming and often cannot be determined until the shape is examined in three dimensions. After the shape is arrived at it is then usually necessary to make a mold form in order to duplicate the shape in small quantities, prior to committing expensive mold making such as required for large production quantities.

One object of my invention is to facilitate the making of patterns and molds by means of a mold forming device such as I disclose and a technique for its use which makes possible the creation and/or copying of a physical contour more quickly and easily than by conventional methods such as referred to, and which therefore is of considerable benefit to industry. The invention also facilitates the making of patterns and molds for vacuum-forming or pressure-forming materials, such as sheet plastic, with a minimum of preparatory work.

Another object is to provide an assembly of housing and a "-fill" of rods therein which are longitudinally adjustable so as to form, by the ends of the rods at one end of he housing, a predetermined contour and which contour is duplicated in reverse by the other ends of the rods, the adjustments of the rods being accomplished manually and individually or by fitting them to a surface to be duplicated.

Still another object is to provide a housing which is made up of laminations that can be adjusted laterally relative to each other to constrict the inner dimension of the housing and thereby lock the rods in their adjusted positions.

A further object is to provide a design of mold forming device in which flexible diaphragms span the ends of the rods to smooth out any molding surface contours which are dictated by the adjustments of the rods.

Still a further object is to provide for evacuating the space among the rods so that air pressure conforms the flexible diaphragms to the contours presented by the ends of the rods.

An additional object is to provide a clamping ring associated with the housing for clamping the peripheral portion of a plastic sheet to he housing, and means to thereafter form the plastic sheet while heated to the contour of the rods in their adjusted positions by vacuum action in one type of device, or by pressure action in another type.

Yet another object is to provide a mold forming device for forming irregular shapes of expanded plastic in a simple and expeditious fashion.

BRIEF SUMMARY OF THE INVENTION

An open end housing has rods freely slidable axially therein and is designed to effect constriction of the internal dimension thereof for locking the rods after they are adjusted to form molding surfaces of any desired contour. The ends of the housing may be closed in by flexible diaphragms brought into contact with the ends of the adjusted rods by forming a vacuum among the rods. A clamping ring may be associated with the housing for clamping a plastic sheet thereover, vacuum or pressure then being used to form the sheet when heated to the contour presented by the ends of the rods.

BRIEF DESCRIPTION OF THE DRAWINGS

FIG. 3 is a vertical sectional view on the line 3–3 of FIG. 1 and illustrates a clamp for the laminations of a housing, which clamp is omitted from FIG. 1;

FIG. 4 is a sectional view similar to FIG. 2 showing a modification of my mold forming device for hot-forming plastic sheets by vacuum, the parts being in an initial position before such forming;

FIG. 5 is a similar view showing the plastic sheet vacuum formed;

FIG. 6 is another modification similar to FIG. 5 showing the plastic sheet pressure formed;

FIG. 7 is a perspective view of a modified mold form of housing and clamping means for rods within the housing;

FIG. 8 is a sectional view of a modified mold forming device for forming irregular shapes by steaming plastic beads retained in a mold cavity;

FIG. 9 is a sectional view of a modified mold forming device similar to that of FIG. 8;

FIG. 10 is a cross-sectional view of a package for an irregular shaped object;

FIG. 11 is a sectional view of a mold forming device, with the irregular-shaped object of FIG. 10 in place to properly position the rods; and FIG. 12 is a sectional view of the mold forming device of FIG. 11 with steaming components attached.

On the accompanying drawings I have used the reference character H to indicate in general a housing and R to indicate in general a plurality of rods therein. FIG. 1 illustrates only some of the rods whereas in actual practice the entire housing is filled with these rods. The rods are illustrated as round but may be other suitable shapes such as square, hexagon, etc., or a mixture of shapes.

The rods R loosely fill the interior of the housing H so that they may be individually adjusted longitudinally, each one either depressed or extended with respect to the end face of the housing. One such adjustment is shown in FIGS. 4 and 5 and another in FIG. 6 to form different contours as will hereinafter appear.

Figure 1:
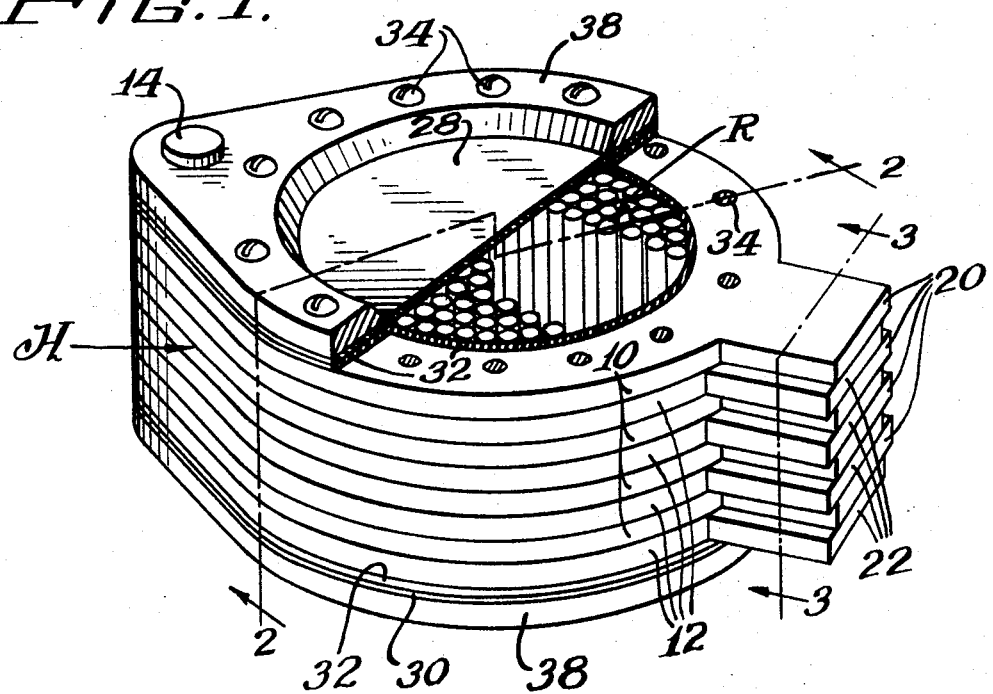
FIG. 1 is a perspective view of my mold forming device with certain portions thereof broken away and other portions shown in section to illustrate details.

It is desirable to provide some means of constricting the inner dimension of the housing H to lock the rods R in position after they are once adjusted. One way of accomplishing this objective includes laminating the housing. The housing shown in FIG. 1 is cylindrical in shape and accordingly may be laminated by constructing it from a plurality of rings 10 alternating with a plurality of rings 12. Obviously when the inner diameters of the rings 10 and 12 are aligned as in FIG. 1, an effective diameter is provided which may be reduced by misalignment of the inner diameters of the rings 10 and 12.

Such misalignment can be accomplished by pivoting all the rings together as by a pivot bolt 14 at one side of the housing and providing projections 20 and 22 from the rings 10 and 12 at the opposite side of the housing which are offset as illustrated when the inner diameters of the rings 10 and 12 are in alignment. Then by providing some kind of clamping means engaging the offset sides of the projections 20 and 22, the tendency upon operation of the clamping means is to align the sides of the projections, thus moving the inner diameters of the rings 10 and 12 to offset relation with each other and therefore clamping positions as illustrated in FIGS. 5 and 6 for instance. For this purpose a C-clamp 16 may be provided having projection engaging equalizer bars 18 and 24 and a pressure screw 26.

The housing H and the rods R thus far described may be used without diaphragms 28 and 30 and without a tubular liner 32 which will now be described. The edges of the liner 32 extend over the outer face of the upper ring 10 and the outer face of the lower ring 12, and so do the marginal peripheral edges of the diaphragms 28 and 30, and may be clamped to these particular rings as by bolts 34 and nuts 36. Clamping rings 38 engage the outer surfaces of the diaphragms 28 and 30 to cooperate with the bolts 34 in properly sealing the diaphragms and the tubular liner relative to the ends of the housing H. A vacuum connection 40 is provided to communicate with the space among the rods R for drawing the diaphragms 28 and 30 into contact with the upper and lower ends of the rods respectively when the connection 40 is subjected to the intake of an operating vacuum pump or the like.

In FIGS. 4 and 5, I show a modification wherein the diaphragms 28 and 30 and the liner 32 are omitted, and a sheet plastic clamping ring 42 is used to clamp the peripheral margin of a heated plastic sheet 44 against one end of the housing H, the clamping action being applied according to arrows 46. A vacuum chamber 48 is provided at the other end of the housing so that when a vacuum is drawn as through a connection 50 according to the arrow 52, the hot plastic sheet 44 shown in FIG. 4 will conform to the contour presented by the upper ends of the rods R as in FIG. 5 at 44a.

In FIG. 6 another modification is shown wherein a pressure chamber 54 and a pressure connection 56 are provided, the pressure chamber cooperating with the clamping ring 42 and thereby operable to pressure form the hot plastic sheet 44 to the shape 44b as distinguished from vacuum-forming.

In the operation of my mold forming device, since the rods R can be loosened or tightened as desired, they may be moved longitudinally when loose, and when tightened they assume a fixed relationship that can be firmly maintained. Accordingly, the loosened rods can be adjusted by pushing them in or pulling them out to any shape desired. The shape can be modified at will. When the desired shape is arrived at, the housing can be adjusted to tighten or lock the rods. Their ends can then be used as a male projection, a female cavity or a composite of the two, depending on whether the upper or lower ends of the rods are utilized as the molding surface. The uneven surface presented by the individual ends of the rods may be smoothed out by the application of plastic material such as plaster, clay or the like, or the diaphragms 28 and 30 may be provided for this purpose to smooth out and refine the contour or final shape.

Figure 2:
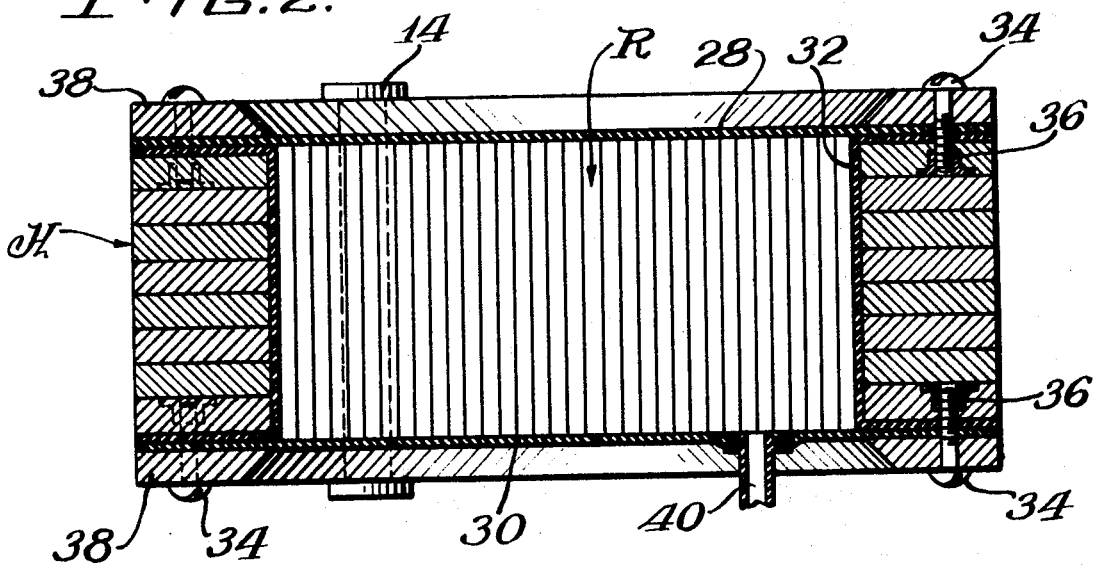
FIG. 2 is a vertical sectional view on the line 2–2 of FIG. 1.

After use, the rods can be returned to their home position shown in FIG. 1 and 2 by loosening the housing, and the return of the rods to create a flat surface as illustrated will automatically remove any plastic material that had been added to refine the surface.

The quality of the surface can be determined by the diameter of the rods used, and the depth to which the rods can be moved is determined by their lengths. The rods may be made of plastic, metal, wood or the like, and their ends may be flat, chamfered, rounded or otherwise modified as found suitable. The housing can be of any shape, a rectangular shape being shown in FIG. 7 wherein a movable wall 56 forms the means for loosening and tightening the rods R, the movement thereof being indicated by arrows 58.

The method for constricting the inner dimension of the housing H shown in FIGS. 1 and 3 is simple and operable. Thin membranes or diaphragms are capable of following the intricate shapes that may be created by adjusting the rods. By extracting air from the housing between the diaphragms, a chamber for internal vacuum is created which forces the diaphragms to take on whatever shape results from having adjusted the rods. These diaphragms also act as a protective surface for the rods to protect them from casting or fill-in compounds, and serve to smooth out the surface irregularities created by the rod end shapes.

As illustrated in FIGS. 5 and 6, my mold forming device may be applied to vacuum or pressure forming machines for sheet plastic and the like. Vacuum-forming is accomplished by positioning a hot sheet of plastic on the exposed face of the rods, clamping it around the edge and drawing the vacuum. The interstices between the rods act as passageways to vacuumize all space within the housing H. Either or both faces of the mold form can be used and the convex and concave forms are complementary to each other and always created simultaneously. Pressure-forming may be accomplished in a comparable manner except as illustrated in FIG. 6.

Both vacuum as in FIG. 5, and pressure as in FIG. 6, can be used together in order to create greater forming force for the plastic sheet 44. Any three-dimensional shape can be copied by pressing the shape into one end of the housing, making sure that the rods are in contact at all points and then creating a mold half or casting half of complementary shape when using that end of the housing. The other end of the housing is used when the three-dimensional shape referred to is to be duplicated. My mold forming device can be used as a medium for creating artistic shapes, much as artists now use clay and the like for that purpose.

The concept of his invention can also be used to form irregular objects from plastic beads by steaming through the beads confined in the housing or alternatively, plastic containers for retaining irregular shaped objects can be made in a similar fashion.

Turning to FIGS. 8 and 9, there are shown arrangements for forming irregular objects O and O' respectively, from plastic beads, for example, polystyrene. In FIG. 8, the rods R are secured in place in each housing H, and the housings are clamped together with plastic beads in place to form the object O. Steam introduced through the inlet opening 150 in chamber defining member 148 passes through the interstices between the rod R and through the beads to cause them to expand to form the irregular shaped object O. Member 154 is secured to the upper housing to form a pressure chamber. Steam passing upwardly through the rods R and plastic beads collects in the chamber defined by member 154 and exits through outlet opening 156.

The arrangement of FIG. 9 functions like that of FIG. 8, but forms an object O' having a flat surface. This results from use of a single housing H having a chamber defining member 148 on one side and a flat pressure cap 160 with vent openings 162 therein secured on the opposite side of housing H from member 148.

In FIG. 10, there is shown a container comprised of halves 200 and 201 for protecting an irregular shaped delicate item O. The mold forming mechanism for forming the halves 200 and 201 is shown in FIGS. 11 and 12. The object O is placed in between the housings H and the rods R are then positioned as shown in FIG. 11 and locked in place as explained above. The housings H are separated and a pressure cap 204 is secured above the housing H and a chamber defining member 206 is secured to the housing H as shown in FIG. 12. The beads to be expanded to form the container half are retained in the cavity between the rods R and the pressure cap 204. Steam is injected through opening 208 and passes through the interstices between the rods R to expand the beads to form the container half. The steam vents through suitable vent openings 210 in the top of the pressure cap 204. The same steps are repeated with the other housing H in order to form the other container half. If the container halves are the same, then only one housing H need be used.

While there has been described presently preferred embodiments of the present invention, it will be understood that the invention is not limited thereto since it may be otherwise embodied within the scope of the following claims.

I claim as my invention:

1. In a mold forming device, a housing having open ends, a plurality of rods loosely filling said housing and individually adjustable longitudinally therein, and means to constrict the inner dimension of said housing to lock said rods against such longitudinal adjustment, said housing being laminated laterally of said rods, and alternate laminations being relatively movable, also laterally, to offset the inner dimensions of said alternate laminations and thereby effect such locking.

2. A mold forming device in accordance with claim 1 wherein alternate laminations are provided with projections offset relative to each other when the inner surfaces of the laminations are aligned, and clamp means is provided for said projections which, upon operation, tends to align said projections and thereby offset said inner dimensions of said alternate laminations.

3. A mold forming device in accordance with claim 2 wherein said projections are at one side of said housing, and pivot means is provided through said laminations at a position substantially opposite said projections.

4. A mold forming device in accordance with claim 1 wherein flexible diaphragms cover the ends of said rods and are sealed to the open ends of said housing.

5. A mold forming device in accordance with claim 2 wherein flexible diaphragms span the open ends of said housing and cover the ends of said rods.

6. A mold forming device in accordance with claim 3 wherein flexible diaphragms span the ends of said housings and are sealed relative thereto.

7. A mold forming device in accordance with claim 4 wherein means is provided to evacuate the space among said rods, between said diaphragms and within said housing to draw said diaphragms into intimate contact with the ends of said rods.

8. A mold forming device in accordance with claim 5 wherein said diaphragms have their marginal edges sealed with respect to the open ends of said housing, and means is provided to evacuate the space within said housing between said diaphragms to draw the latter into intimate contact with the ends of said rods.

9. A mold forming device in accordance with claim 6 wherein means is provided to evacuate the space between said diaphragms and among said rods to draw the diaphragms into intimate contact with the ends of said rods.

10. A mold forming device in accordance with claim 5 wherein a flexible tube is provided lining said housing and extending from diaphragm to diaphragm.

11. A mold forming device in accordance with claim 8 wherein a flexible tube is provided lining said housing, extending from diaphragm to diaphragm and sealed relative to said marginal edges thereof.

12. A mold forming device in accordance with claim 3 adapted for vacuum-forming a plastic sheet and wherein a clamping ring is provided for a peripheral portion of the plastic sheet with respect to one end of said housing, the other end of said housing having means for sealing the same to establish a vacuum chamber between said last mentioned means, said housing and said plastic sheet.

13. A mold forming device in accordance with claim 3 adapted for pressure-forming a plastic sheet and wherein a clamping ring is provided for a peripheral portion of the plastic sheet with respect to one end of said housing, means being provided for sealing said clamping ring with respect to said end of said housing to establish a pressure chamber between said last mentioned means, said clamping ring and said plastic sheet.

14. In a mold forming device, a housing having open ends, a plurality of rods loosely filling said housing and individually adjustable longitudinally therein, and means to constrict the inner dimension of said housing to lock said rods against such longitudinal adjustment, a chamber-defining member secured to one side of said housing and a pressure cap secured to said housing, a cavity being defined between the rods and the pressure cap for receiving beads to be expanded, and means for injecting steam into the housing and through said cavity for expanding said beads and forming an object conforming to the shape of the cavity.

15. In a mold forming device, a housing having open ends, a plurality of rods loosely filling said housing and individually adjustable longitudinally therein, and means to constrict the inner dimension of said housing to lock said rods against such longitudinal adjustment, a wall means closing the ends of said housing and said rods being positioned to form a cavity for receiving beads to be expanded, means for injecting steam into said housing for expanding the beads to form an object corresponding to the shape of the cavity.